United States Patent
Dabby et al.

[11] 4,294,601
[45] Oct. 13, 1981

[54] APPARATUS AND PROCESS FOR AUTOMATIC CONTROL OF THE PRODUCTION OF OPTICAL FIBER

[75] Inventors: Franklin W. Dabby, Woodbridge; Ronald B. Chesler, Cheshire, both of Conn.

[73] Assignee: Times Fiber Communications, Inc., Wallingford, Conn.

[21] Appl. No.: 57,501

[22] Filed: Jul. 13, 1979

[51] Int. Cl.³ .................. C03B 37/025; C03B 37/07; C03B 37/075

[52] U.S. Cl. ......................... 65/3.12; 65/13; 65/29; 65/144; 65/158; 65/11.1; 65/18.4

[58] Field of Search .................. 65/3 A, 2, 13, 11 R, 65/18, 144, 29, 158, 3.12; 356/73.1

[56] References Cited

U.S. PATENT DOCUMENTS

| | | | |
|---|---|---|---|
| 3,765,774 | 10/1973 | Petrohilos | 356/387 |
| 3,879,128 | 4/1975 | Presby | 65/2 X |
| 3,932,160 | 1/1976 | Camlibel et al. | 65/3 A |
| 3,957,474 | 5/1976 | Kobayashi et al. | 65/3.12 |
| 3,982,816 | 9/1976 | Watkins | 356/73.1 |
| 4,046,536 | 9/1977 | Smithgall, Sr. | 65/2 |

OTHER PUBLICATIONS

Wood et al., "Investigation of the Reactions of SiCl₄ and O₂ . . . ", Journal of Materials Science, 1978, vol. 13, pp. 1761–1768.

Primary Examiner—Richard V. Fisher
Attorney, Agent, or Firm—Bacon & Thomas

[57] ABSTRACT

Apparatus and process for automatic control of the production of optical fiber are disclosed. The process comprises continuously depositing and sintering borosilicate glass particles on a fused silica rod or a graded index rod in such a manner that the glass exhibits a uniform, radially increasing concentration of boron. The appropriate boron oxide/silica concentration ratio in the glass particles is controlled by the time of deposit and the weight and diameter of the rod, which are continuously monitored. The concentration of boron oxide and silica in the particulate is likewise continuously monitored to insure that the correct portion of boron oxide/silica is deposited.

The apparatus for conducting the process, includes means for continuously monitoring the weight and diameter of the rod and the boron oxide content of the glass particles and means for automatically regulating the equipment used to produce the optical fiber in response to readings from the monitoring means.

19 Claims, 2 Drawing Figures

APPARATUS AND PROCESS FOR AUTOMATIC CONTROL OF THE PRODUCTION OF OPTICAL FIBER

BACKGROUND OF THE INVENTION

1. Field of the Invention

The present invention is directed to an improved process and apparatus for the manufacture of optical fiber.

2. Description of the Prior Art

During the past decade, a great deal of work has been undertaken directed to the manufacture of glass transmission lines for visible and near-visible electromagnetic radiation, commonly referred to as optical waveguides or optical fiber. In brief, optical waveguides are extremely thin, flexible glass fibers, prepared by drawing glass preforms under controlled conditions. Although these conditions are subject to wide variation, depending upon such factors as the composition of the glass and the drawing procedure, the optical waveguide so prepared will comprise, in its simplest form, a glass core of a given, constant diameter, surrounded by a glass cladding having an index of refraction less than that of the glass core. The cladding acts as a barrier which confines the light to the core.

While the drawing procedure is important in obtaining a properly functioning optical waveguide, it is the production of the glass preform which is drawn into the fiber which controls the ultimate composition and hence transmission properties of the waveguide. Thus far, workers in the art have proposed to manufacture such preforms in several ways. One method, described in U.S. Pat. No. 3,932,160, forms a glass preform by deposition of borosilicate particulate on a pure silica start rod by high temperature pyrolysis of a gaseous mixture of silane and borane or a gaseous mixture of silicon tetrachloride and boron trichloride. The temperatures required to effect the pyrolysis reaction can be produced by conducting the deposition in a reaction furnace which heats both the gaseous mixture of reactants and the rod. Alternately, the requisite temperatures can be obtained by directing the reactants through a natural gas flame in the presence of oxygen. The pyrolysis reaction produces fine particles of borosilicate glass which are deposited on the pure fused silica start rod and, upon sintering, form the outer region of the core and cladding of the preform.

To produce a preform having a graded profile, that is, a radially varying index of refraction, the ratio of the silicon containing reactant to the boron containing reactant in the gaseous mixture is varied in such a manner that borosilicate particulate having increasing proportions of boron oxide relative to silica is produced. Moreover, to insure that the deposition of borosilicate is uniform for a given distance from the preform axis, the start rod must be simultaneously translated and rotated to provide even distribution of the particulate over the length of the rod. Thus, by setting a uniform translation and rotation rate for the start rod, the concentration of components in the gaseous mixture can be continuously varied so as to achieve the desired radial concentration profile of borosilicate which is uniform for any given radial distance from the center of the silica rod. In such systems, then, time is the parameter which controls the concentration of components in the borosilicate particulate.

However, as the nature of optical waveguides is such that slight discrepancies in composition may cause significant deleterious results in transmission capability, it is desirable to provide means in addition to time for precisely controlling the deposition of the borosilicate particulate on the start rod to insure production of a preform having the desired radial concentration profile.

SUMMARY OF THE INVENTION

Accordingly, it is an object of the present invention to provide a method for preparing a preform which can be drawn into optical fiber, which allows for the precise control of the composition of the borosilicate deposited on the glass start rod.

Another object of the invention is to provide a method for automatically varying the composition of the borosilicate particulate as it is being deposited on the start rod so as to obtain a preform having a uniform, graded index of refraction profile.

Still other objects and advantages of the present invention will become apparent to those of skill in the art upon review of the entire disclosure.

The foregoing objects and advantages are accomplished by providing a process for the production of optical fiber which comprises preparing a preform by depositing and sintering borosilicate particles on a cylindrical glass rod, heating the preform so prepared to the drawing temperature and drawing it into optical fiber in which the composition of the borosilicate particulate deposited on the rod is continuously adjusted in response to measurements of the time of deposit of the particulate and the weight and diameter of the rod. The composition of the borosilicate particulate may also be monitored to determine its boron oxide content as it is deposited on the rod via infra-red spectrophotometry.

DETAILED DESCRIPTION OF THE INVENTION

Figure 1:
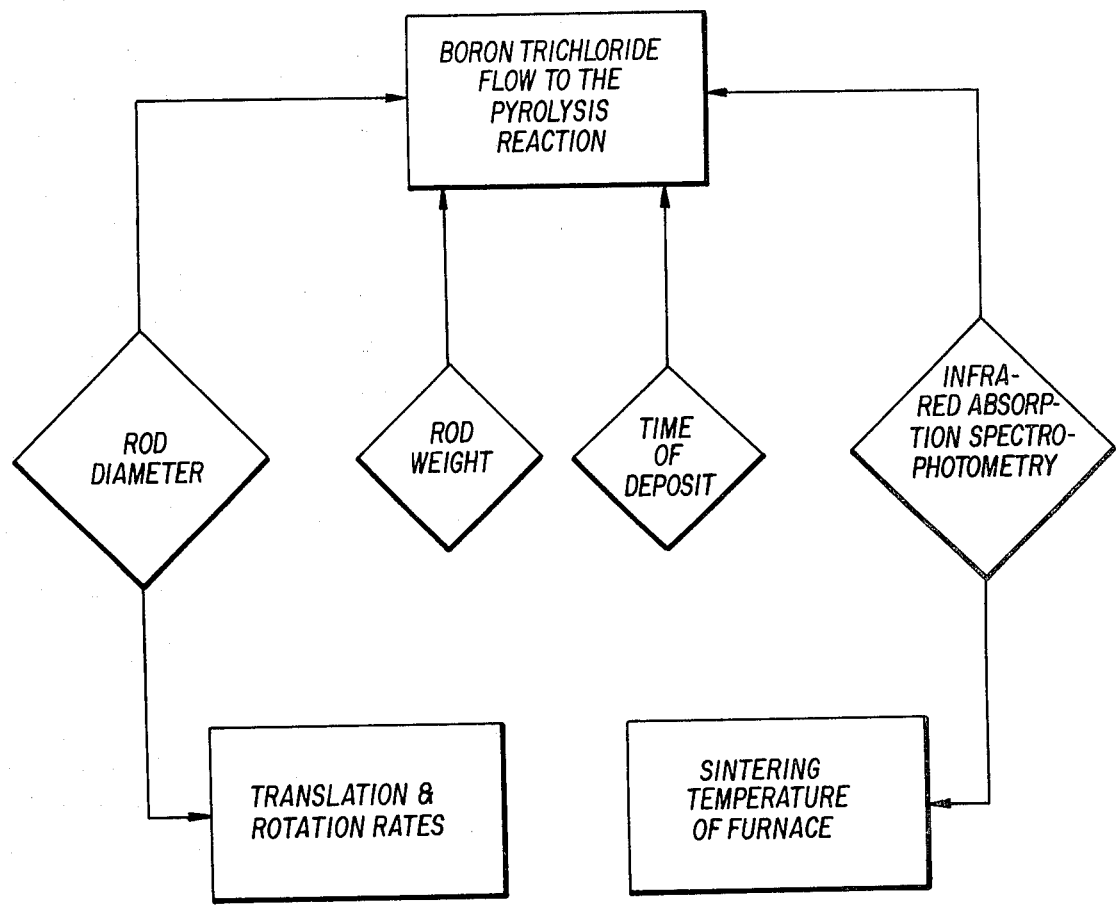
FIG. 1 represents a flow chart which describes the interrelation of the various aspects of the present invention.

In conventional methods for preparing glass preforms by depositing and sintering borosilicate particles on a glass start rod, the composition of the borosilicate particulate is controlled by adjusting the flow of the reactant gases, particularly the boron containing reactant, generally boron trichloride, which is subjected to high temperature pyrolysis. Although boron trichloride and silicon tetrachloride are the preferred reactants, $SiH_4$ and $SiBr_4$ and $B_2H_6$ and $BBr_3$, can also be used as the silicon and boron containing reactants, respectively. Typically, the flow of boron trichloride is adjusted in response to the weight of the particulate deposited on the start rod while the silicon tetrachloride flow is held constant. As this weight increases, the flow of boron trichloride to the furnace or flame is increased, which in turn increases the concentration of boron oxide in the borosilicate particulate produced by the high temperature pyrolysis reaction. When a final, pre-determined weight is reached, the flow of reactant gases is shut off and the rod is heated to the sintering temperature to produce the glass preform. Alternately, the flow of reactant gases can be uniformly, continuously varied over a pre-determined time period and then shut off.

A significant drawback to the time and weight determinative method for depositing the borosilicate particles is that very precise control of the translation and rotation rates of the glass start rod is necessary to insure uniform deposition of the particulate material. As control of the stream of particulate material produced in the pyrolysis reaction is based solely on the length of time from start or weight of the rod, it is possible to obtain a preform having the right quantity of particulate deposited thereon in terms of mass, but due to imprecise translation and/or rotation rates, exhibiting an uneven and non-uniform diameter and composition profile.

To the contrary, when the diameter of the rod is used as an additional parameter for adjusting the particulate composition, uneven and non-uniform segments in the preform can be avoided since the translation and/or rotation rate of the start rod and the flow of boron trichloride reactant to the pyrolysis reaction can be adjusted to fill voids with borosilicate particulate of the proper composition, to produce a uniform composition profile having radially increasing concentrations of boron oxide relative to silica.

Thus, according to the method of the present invention, the time of deposit and the weight and the diameter of the glass start rod are continuously monitored and the translation and/or rotation rates of the rod and the flow of boron trichloride to the pyrolysis reaction zone are adjusted in response to these measurements. This method is most efficaciously coordinated by a computer that has been programmed to automatically adjust the flow of boron trichloride reactant gas to particular levels in response to particular time, weight, and/or diameter measurements while the silicon tetrachloride flow is held constant. The weight of the rod is continuously monitored by electric scales as is well known to those of skill in the art. The diameter of the rod is continuously monitored by a laser beam which is capable of detecting minute changes in the diameter in the order of microns. Typical of devices which provide this sensitive measurement capability is that disclosed in U.S. Pat. No. 3,765,774, the disclosure of which is hereby incorporated by reference.

As the diameter monitoring device observes changes in the diameter of the rod as borosilicate particulate is deposited, it electronically communicates them to the computer which in turn automatically adjusts the flow of boron trichloride reactant in accordance with its programming. The diameter monitoring device is also electronically connected to a motor which controls the translation and/or rotation rates of the glass rod. Hence, if the diameter monitoring device observes discrepancies in the diameter of the rod, the rate of rotation and/or translation is automatically adjusted to compensate and produce a uniform deposit of particulate material of the appropriate composition. Thus, while time and weight monitoring insures that the appropriate amount of borosilicate particulate is deposited on the rod, diameter monitoring insures that it is uniformly distributed across the length of the rod at the appropriate composition for a given radial distant from the rod axis.

According to a further embodiment of the invention, the composition of the borosilicate particulate released by the pyrolysis reaction is continuously monitored as it is deposited on the rod, by infra-red absorption spectrophotometry. An analysis of the infra-red spectroscopical characteristics of high temperature reactions of silicon tetrachloride and oxygen is reported by Wood et al, "Investigation of the Reactions of $SiCl_4$ and $O_2$ at Elevated Temperatures by Infra-Red Spectroscopy", *Journal of Materials Science* 13 (1978) pp. 1761–1768. By continuous examination of the infra-red absorption bands exhibited by the particulate stream leaving the pyrolysis reaction zone, the composition of the stream in terms of the ratio of boron oxide to silica can be determined. This serves as a check of the stoichiometric precision of the pyrolysis reaction and insures that particulate of the desired composition is deposited. A device known in the art as a monochromator provides the means for accomplishing this aspect of the invention. As with the diameter monitoring device, the monochromator is electronically connected to the valves for introducing boron trichloride gas to the pyrolysis reaction zone. Hence if the infra-red absorption band indicates that the particulate is deficient in boron oxide relative to silica for the particular diameter, the valve will be automatically adjusted to increase the flow of boron trichloride to the reaction zone, and vice versa.

While the method of the present invention has been described in terms of the manufacture of a borosilicate preform, it will be understood by those of skill in the art that it is easily adapted for use with any conventional glass preform manufacturing process in which glass particulate is continuously deposited on a moving start rod. In such conventional processes, the particulate is sintered after deposition is completed. However, according to a preferred embodiment of the present invention, at least one independent source of heat is provided, at a point along the length of the rod and continuously sinters the glass particulate after it is deposited. Typically, a cylindrical furnace surrounding the glass rod serves as this heat source. In the most preferred embodiment, an independent heat source is positioned on each side of the point of deposition of the particulate on the rod. In this manner, the particulate is continuously deposited on a sintered layer of the particulate which was deposited on the previous pass through the particulate stream. This continuous sintering enhances the uniformity of the preform.

The temperature of the heat source is automatically varied in response to the composition of the deposited particulate and generally ranges from about 500° to 1500° C. when borosilicate particulate is deposited. The temperature of the heat source is adjusted to the precise sintering temperature automatically in response to readings from the monochromator which identifies the boron oxide content of the particulate. Accordingly, the appropriate sintering temperature for a given particulate composition is insured. It is also desirable to conduct the sintering operation under an atmosphere of helium to prevent the formation of bubbles in the deposited particulate. Additionally, a multi-chamber sintering furnace may be used to house a second atmosphere containing $SO_2Cl_2$ which removes entrapped hydrogen from the deposited particulate.

Drawing of the glass preform is accomplished in a separate drawing furnace where the preform is heated to the drawing temperature and drawn into fiber. It is also possible to employ diameter monitoring devices in this stage of the process as taught by U.S. Pat. Nos. 4,046,536, 3,982,816 and 3,879,128.

The apparatus for carrying out the method of the invention comprises, in combination, means for holding a cylindrical glass start rod and imparting translational and rotational motion thereto, means for producing high temperature pyrolysis of silicon and boron containing gaseous mixtures and directing the particulate product towards the glass start rod, means for continuously monitoring time during deposition, means for continuously monitoring the infra-red absorption spectrophotometry of the particulate produced by the pyrolysis reaction and directed toward the rod, means for continuously sintering the deposited particulate and finally, means for coordinating and adjusting the flow of reactants to the pyrolysis reaction and the translational and/or rotation rates of the rod in response to diameter and infra-red absorption spectrophotometry measurements and for adjusting the sintering temperature in response to infra-red spectrophotometry measurements of the particulate material being directed toward the rod.

Various means for holding the glass start rod are well known to those skilled in the art. Such devices include motors for imparting translation and rotation to the rod to enable obtainment of an evenly distributed deposit. The glass start rod may be a pure fused silica rod of approximately 3 to 6 mm in diameter or a graded start rod of the same dimension. The graded start rod is prepared from a pure fused silica rod by preliminary deposition and sintering of borosilicate particulate followed by drawing to reduce the rod to the proper starting dimension of approximately 3 to 6 mm. The use of such graded start rods is preferred as they reduce the interface between the pure silica central area of the preform and the borosilicate outer region and provide a more ideal graded compositional profile for the resulting optical fiber.

As previously described, the particulate material is produced by high temperature pyrolysis of gaseous mixtures of a silicon containing compound and a boron containing compound, preferably silicon tetrachloride and boron trichloride. The pyrolysis reaction can be conducted in a reaction furnace or in a natural gas flame in the presence of oxygen. The reactant gas mixtures are directed through the flame or furnace in the direction of the glass rod where they react to form the borosilicate particulate which deposits on the glass start rod. By adjusting the flow of either reactant gas mixture, the composition of the borosilicate particulate product is varied. Generally, it is desirable to maintain the flow of silicon tetrachloride constant and adjust solely the flow of boron trichloride to the pyrolysis reaction. The flow of boron trichloride is adjusted so as to achieve a borosilicate particulate which, when deposited, exhibits an increasing compositional profile of boron oxide relative to silica to comprise the core of the preform. The cladding is deposited with constant composition of boron oxide relative to silica. The ratio of boron oxide to silica in the particulate deposit varies from in initial value of zero when a pure silica start rod is employed to a final value of approximately 3 or more in the cladding of the preform. When a graded start rod is employed the initial ratio is selected to correspond to the ratio at the surface of the rod.

The means for continuously monitoring the diameter of the rod is positioned just before the point of deposition of the particulate so that the flow of reactants to the pyrolysis reaction and hence the composition of the particulate can be adjusted in response to diameter measurements. The means for monitoring the infra-read absorption spectrophotometry of the particulate is positioned between the point of the pyrolysis reaction and the rod. Finally, the heat source for continuously sintering the deposited particulate is positioned after the point of deposition so as to accomplish sintering immediately after deposition.

The coordination of the foregoing monitoring devices is provided by a computer which is programmed to adjust the flow of boron trichloride to the pyrolysis reaction, the rates of translation and rotation of the rod and the temperature of the sintering furnace in response to particular readings from the various monitoring devices. This procedure is depicted in the flow diagram in FIG. 1.

Figure 2:
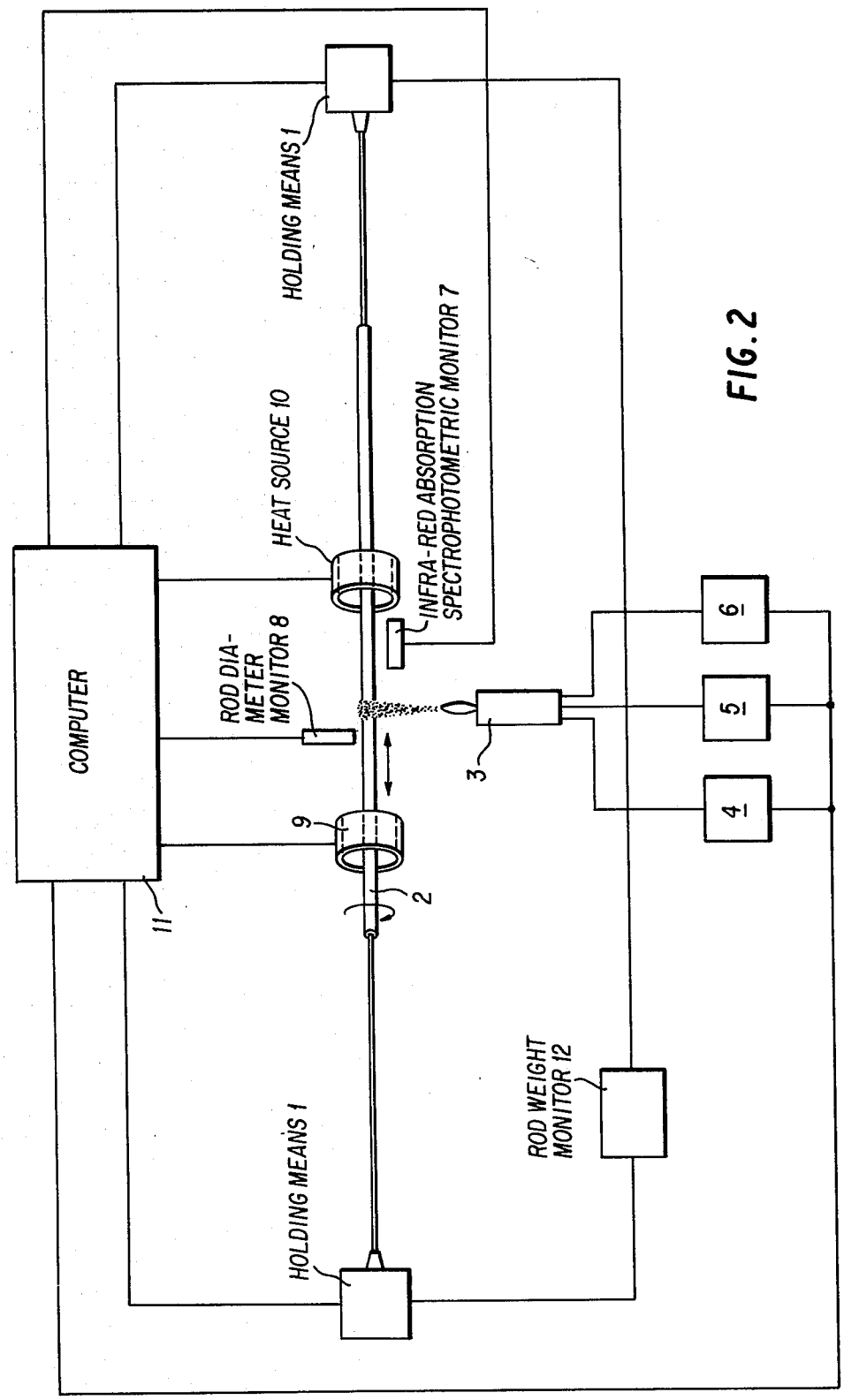
FIG. 2 depicts a highly stylized illustration of the apparatus used to perform the method of the invention.

FIG. 2 provides a highly stylized view of the apparatus for carrying out the preferred embodiment of the invention, comprising means 1 for holding a cylindrical glass start rod 2 and for imparting translational and rotational motion thereto, means 3 for producing high temperature pyrolysis of silicon and boron containing gaseous mixtures supplied by containers 4 and 5 in the presence of oxygen supplied by container 6, means 7 for continuously monitoring the infra-red absorption spectrophotometry of the particulate produced by the pyrolysis reaction, means 8 for continuously monitoring the diameter of the rod 2 as particulate is deposited, means 9 and 10 for continuously sintering the particulate after it is deposited on the rod and means 11 for coordinating and adjusting the flow of gaseous reactants to the pyrolysis reaction and the translation and/or rotation rates of the rod in response to diameter and infra-red absorption spectrophotometry measurements. Holding means 1 is co-ordinated with means 12 for continuously monitoring the weight of the rod 2 as particulate accumulates thereon.

The process and apparatus of the present invention thus allows for the automatic control of the production of preforms which are drawn into optical fibers. By proper programming of the computer, optical fibers having precise composition and refractive index profiles are obtained. Imperfections resulting from conventional manual control are completely eliminated. Accordingly, the quality and uniformity of the optical fiber produced is improved over manufacturing processes conventionally employed.

While the present invention has now been described in terms of certain preferred embodiments, and exemplified with respect thereto, the skilled artisan will readily appreciate that various modifications, changes, omissions, and substitutions may be made without departing from the spirit thereof. It is intended, therefore, that the present invention be limited solely by the scope of the following claims.

What is claimed is:

1. A process for the production of optical fiber comprising preparing a preform by depositing and sintering borosilicate particles on a cylindrical glass rod, heating said preform to the drawing temperature, and drawing said preform into optical fiber, wherein the diameter of the glass rod is continuously monitored during deposition of the borosilicate particles and the composition of said particles is adjusted in response to the diameter measurements such that the particles are uniformly distributed across the length of the rod at the appropriate composition for a given radial distance from the rod axis.

2. The process as defined by claim 1, wherein the borosilicate particles are continuously sintered after they are deposited so that each layer of borosilicate particles after the first layer is deposited on a previously sintered layer of borosilicate.

3. The process as defined by claim 1, further comprising continuously monitoring the boron oxide content of the borosilicate particles as they are deposited via infra-red absorption spectrophotometry.

4. The process as defined by claim 1, further comprising adjusting the translation and/or rotation rates of said cylindrical glass rod in response to said diameter measurements.

5. The process as defined by claim 1, wherein said borosilicate particles are produced by high temperature pyrolysis of a first gaseous reactant selected from the group consisting of $SiH_4$, $SiCl_4$ and $SiBr_4$ and a second gaseous reactant selected from the group consisting of $B_2H_6$, $BCl_3$ and $BBr_3$.

6. The process as defined by claim 5, wherein said reactants are $SiCl_4$ and $BCl_3$.

7. The process as defined by claim 6, wherein the weight of the glass rod is continuously monitored during deposition of the borosilicate particles.

8. The process as defined by claim 5, wherein said high temperature pyrolysis is conducted as a flame pyrolysis by burning natural gas in the presence of oxygen.

9. An apparatus for the production of optical fiber comprising means for holding a cylindrical glass start rod and imparting translational and rotational motion thereto, means for producing high temperature pyrolysis of silicon and boron containing gaseous mixtures and directing the particulate product towards the glass start rod, means for continuously monitoring the infra-red absorption spectrophotometry of the particulate produced by the pyrolysis reaction and directed toward the rod, means for continuously monitoring the diameter of the rod and means for co-ordinating and adjusting the flow of the gaseous reactants to the pyrolysis reaction and the translation and/or rotation rates of the rod in response to diameter and infra-red absorption spectrophotometry measurements.

10. The apparatus as defined by claim 9, further comprising means for continuously sintering the particulate after it is deposited so that each layer of particulate after the first layer is deposited on a previously sintered layer of borosilicate.

11. The apparatus as defined by claim 10, wherein said means for continuously sintering said deposited particles is a furnace which surrounds a portion of said glass start rod.

12. The apparatus as defined by claim 9, wherein said means for continuously monitoring the diameter of the rod utilizes a laser beam directed at the rod.

13. The apparatus as defined by claim 9, wherein said means for continuously monitoring the infra-red absorption spectrophotometry of the particulate produced by the pyrolysis reaction comprises a monochromator.

14. The apparatus as defined by claim 9, wherein said means for coordinating and adjusting the flow of gaseous reactants to the pyrolysis reaction and the translation and/or rotation rates of the rod in response to diameter and infra-red absorption spectrophotometry measurements comprises a high speed digital computer.

15. The apparatus as defined by claim 9, further comprising means for continuously monitoring the weight of the rod.

16. In a process for the production of optical fiber comprising preparing a preform by depositing and sintering glass particles on a cylindrical glass rod, heating said preform to the drawing temperature, and drawing said preform into optical fiber, the improvement comprising continuously monitoring the diameter of the glass rod during deposition of the glass particles and adjusting the composition of said particles in response to the diameter measurement such that the particles are uniformly distributed across the length of the rod at the appropriate composition for a given radial distance from the rod axis.

17. The process as defined by claim 16, wherein said improvement further comprises continuously monitoring the weight of the glass rod during deposition of the glass particles.

18. An apparatus for the production of optical fiber comprising means for holding a cylindrical glass start rod and imparting translational and rotational motion thereto, means for producing high temperature pyrolysis of gaseous mixtures capable of forming a glass particulate product and for directing said glass particulate product towards the glass start rod, means for continuously monitoring the infra-red absorption spectrophotometry of the particulate produced by the pyrolysis reaction and directed toward the rod, means for continuously monitoring the diameter of the rod, and means for co-ordinating and adjusting the flow of the gaseous reactants to the pyrolysis reaction and the translation and/or rotation rates of the rod in response to diameter and infra-red absorption spectrophotometry measurements.

19. The apparatus as defined by claim 18, further comprising means for continuously monitoring the weight of the rod.

* * * * *